United States Patent [19]
Eldred

[11] 3,950,238
[45] Apr. 13, 1976

[54] RADIATION CURED ACRYLONITRILE-BUTADIENE ELASTOMERS

[75] Inventor: Roger J. Eldred, Detroit, Mich.

[73] Assignee: General Motors Corporation, Detroit, Mich.

[22] Filed: Aug. 9, 1974

[21] Appl. No.: 496,146

[52] U.S. Cl. ........ 204/159.15; 204/159.16; 260/879
[51] Int. Cl.² ......................... C08F 8/00; C08L 9/02
[58] Field of Search ................. 204/159.15, 159.16; 260/879

[56] References Cited
UNITED STATES PATENTS

| | | | |
|---|---|---|---|
| 3,551,311 | 12/1970 | Nass et al. ..................... | 204/159.15 |
| 3,751,378 | 8/1973 | Cowperthwaite et al. .......... | 260/879 |
| 3,758,439 | 9/1973 | Fodor ................................ | 260/879 |
| 3,770,490 | 11/1973 | Parker .......................... | 204/159.16 |
| 3,783,006 | 1/1974 | Hahn et al. ..................... | 204/159.16 |
| 3,809,569 | 5/1974 | Aronoff et al. ................. | 204/159.16 |
| 3,840,448 | 10/1974 | Osborn et al. .................. | 204/159.16 |

*Primary Examiner*—Murray Tillman
*Assistant Examiner*—Thurman K. Page
*Attorney, Agent, or Firm*—George A. Grove

[57] ABSTRACT

In accordance with a preferred embodiment of this invention, the ultimate elongation of an electron beam radiation cured acrylonitrile-butadiene elastomer is significantly increased by the incorporation of a preferred noncrosslinking monomer, glycidyl methacrylate, in combination with the conventional crosslinking monomer, trimethylolpropanetrimethacrylate, prior to the radiation curing process.

3 Claims, No Drawings

RADIATION CURED ACRYLONITRILE-BUTADIENE ELASTOMERS

FIELD OF THE INVENTION

This invention relates to high energy, electron beam radiation cured, acrylonitrile-butadiene elastomers which have improved elongation characteristics.

BACKGROUND OF THE INVENTION

It is well known that some polymers will crosslink if subjected to high energy, ionizing radiation and that the physical and chemical properties of these polymers may be significantly improved by such a process. However, applications of this process have been limited by the relatively large radiation dosage required to significantly crosslink the polymer matrix.

More recently, it was learned that by the addition of certain monomers having multiple points of ethylenic unsaturation to the polymer prior to irradiation, the required radiation dosage could be reduced by as much as 60 to 70%. Apparently, each point of unsaturation reacts and forms a chemical bond with the polymer matrix, and the monomer thereby serves as a crosslinking agent similar to sulfur in conventionally vulcanized rubbers; such monomers are appropriately termed "crosslinking monomers". This development made the radiation crosslinking process economically feasible and sparked a great deal of interest in a variety of potential applications for radiation cured polymer materials.

In applying this technique to acrylonitrilebutadiene (hereinafter "NBR") elastomeric compositions, it was soon evident that trimethylolpropanetrimethacrylate (hereinafter "TMPT") was the most effective crosslinking monomer. However, in the development of articles made from a radiation cured NBR elastomer, it was discovered that the ultimate elongation of the material was severely reduced if TMPT were used to accelerate the crosslinking process. This loss of elongation rendered the product unsuitable for many applications.

OBJECTS OF THE INVENTION

It is an object of this invention to provide a high energy, electron beam radiation cured NBR elastomer having improved elongation properties.

It is a further object of this invention to increase the ultimate elongation of a radiation cured NBR elastomer by incorporating therein a polymerizable non-crosslinking monomer prior to the irradiation curing process.

SUMMARY OF THE INVENTION

In accordance with a preferred embodiment of this invention, these and other objects are accomplished by providing a radiation curable composition containing 100 parts by weight of an uncured NBR copolymer, from 20 to 60 parts by weight carbon black, from 6 to 12 parts by weight of trimethylolpropanetrimethacrylate and from 1.15 to 1.25 moles of glycidyl methacrylate (hereinafter "GMA") per mole of TMPT. This composition is then subjected to from 5 to 10 megarads of electron beam radiation.

An elastomer prepared in accordance with this preferred embodiment has an ultimate elongation in the range of 220 to 440% compared to an ultimate elongation of from 125 to 200% for a radiation cured NBR elastomer which contains only the crosslinking monomer. These and other advantages of the invention will be better understood in view of a detailed description thereof, to include specific examples.

DETAILED DESCRIPTION OF THE INVENTION

In accordance with this invention a modified, radiation cured NBR elastomer is produced with improved elongation properties. This is achieved by the addition of a polymerizable monomer, having one point of ethylenic unsaturation, to the NBR composition prior to the radiation curing process. This modification unexpectedly counteracts the reduction in elongation caused by the use of a crosslinking monomer to increase the efficiency of the radiation-crosslinking process and to thereby reduce the energy required for curing.

Suitable elastomeric compositions prepared in accordance with this invention may initially contain, by weight, 100 parts of an NBR elastomeric copolymer, from 15 to 80 parts of a carbon black, from 4 to 16 parts of trimethylolpropanetrimethacrylate (TMPT), and a suitable noncrosslinking monomer wherein the mole ratio of noncrosslinking monomer to TMPT is within the range of from 1.0 to 1.4. The subject compositions may also contain small amounts of other suitable additives such as antioxidants, light and heat stabilizers, and the like.

NBR elastomers are typically random copolymers of acrylonitrile and butadiene which also contain fillers and other additives. Commercially available NBR elastomers have an acrylonitrile concentration of either 27 or 34 or 45% by weight, based on the total copolymer; these figures are determined by the polymerization parameters. It has been found that suitable radiation cured elastomeric compositions may be formed in accordance with this invention from NBR copolymers having from 30 to 45% by weight acrylonitrile.

The crosslinking monomers used to increase the radiation curing efficiency typically contain 2 or more points ethylenic unsaturation. In accordance with this invention, trimethylolpropanetrimethacrylate is the preferred crosslinking monomer; the molecules of this compound contain 3 points of ethylenic unsaturation, each of which is capable of reacting with the NBR matrix under the influence of ionizing radiation and thereby forming molecular bridges or crosslinks between various points in the matrix. However, because of the nature of either the reactants or the crosslinking process, there is a significant reduction in the ultimate elongation of such elastomers when compared to similar materials cured without the TMPT.

In an effort to remedy this deficiency, I have found that monomers having one point of ethylenic unsaturation and described by any of the following structural formulas are effective in increasing the ultimate elongation of a radiation cured NBR elastomer which contain a crosslinking monomer such as TMPT. These noncrosslinking monomers are incorporated in the noncured composition at an amount so that the mole ratio of noncrosslinking monomer to crosslinking monomer is within the range of 1.0 to 1.4.

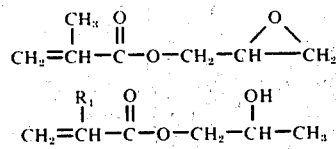

-continued (3) 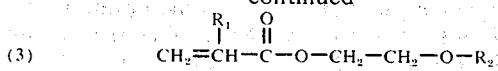

wherein $R_1$ may be —H or —$CH_3$, and $R_2$ may be —H or an alkyl group having up to 10 carbon atoms. Because these monomers have only one point of ethylenic unsaturation, they cannot act as crosslinking monomers; however, they can polymerize through that point of unsaturation and a reaction of that type may occur during the radiation curing process.

More specifically, it is believed that the noncrosslinking monomer molecule contributes to the elongation properties of the elastomer by participating in the crosslinking process in such a manner that it inserts itself into the molecular, crosslinking bridge. This would lengthen the bridge and thereby add a degree of flexibility to the cured matrix. Furthermore, my experiments indicate that the ability of the noncrosslinking monomer to function in this application is dependent upon the presence of a —O—C—C—O— molecular configuration attached to the carbonyl group in the ester group. Apparently, this structure provides the proper chemical reactivity which allows the noncrosslinking monomer to function in this application. It is to be emphasized that the exact mechanism by which the noncrosslinking monomer functions is not completely understood at this time and that the above theoretical explanation is not to be construed as a limit to the scope of this invention.

Regardless of the operative mechanism, the subject noncrosslinking monomers are able to either participate in or influence the radiation-induced crosslinking reaction so as to modify the crosslinked matrix and thereby provide the improved elongation characteristics.

Typically, NBR elastomers also contain other additives such as carbon black, antioxidants, etc. The subject noncrosslinking monomers are compatible with these additives and, therefore, do not require extensive reformulation of existing elastomeric systems.

After the ingredients are blended into a relatively uniform dispersion, the mixture is then subjected to high energy, electron beam radiation having suitable beam current to provide a radiation dose of from 5 to 10 megarads within a reasonable period of time.

The following examples have been included to demonstrate the procedures used in preparing the subject elastomeric composition and the effectiveness of the noncrosslinking monomer in enhancing the elongation of these NBR rubbers.

EXAMPLE 1

In this and each of the following examples the subject NBR compositions were prepared in accordance with conventional methods. In this example, 100 parts by weight of a noncured, nonfilled NBR rubber were banded onto one roll of a two-roll mill; and then about 20 parts of carbon black were gradually added to the banded composition as the rolls turned. The milling action uniformly dispersed the filler throughout the rubber. An additional 20 parts of the carbon black, throughout which 8 parts of TMPT and 4 parts of glycidyl methacrylate had been uniformly dispersed, were then added to and dispersed throughout the banded composition.

The noncured composition was then removed from the two-roll mill and tensile slabs (6.0 inches × 6.0 inches × 0.08 inch) were compression molded at a temperature of about 150°F. It is believed that no curing, i.e. crosslinking, occurred during this operation. These slabs were then placed on a cart and passed under the radiation beam produced by a 1.5 MEV Dynamitron Electron Beam Accelerator having a maximum current capacity of 15 milliamps. The total radiation dose was controlled by adjusting the cart speed, the current and the number of passes. In this specific example, the slabs were irradiated at a current of 4.2 milliamps and a cart speed of 40 centimeters per second, which is the equivalent to about 0.25 megarad per pass. A total radiation dose of 10 megarads were required to cure this particular composition to the same extent as that of the conventional sulfur-cured control compounds. The extent of cure was followed by measuring the equilibrium swelling of the material in toluene at 25° C. No attempt was made to relate this swell ratio to the actual crosslink density as this relationship is difficult to establish due to the nonhomogeneous stress field generated by the restricted swelling at the rubber-carbon black interface.

The NBR elastomeric composition produced by the procedures described in this example and which contained 4 parts glycidyl methacrylate and 8 parts of TMPT had an elongation at break of 440%. This is more than twice the elongation of a radiation cured elastomer which does not contain the noncrosslinking monomer.

In accordance with the procedures outlined in this example, three additional series of experiments were run employing varying amounts of both TMPT and the GMA, and the elongation of these samples were compiled in Table I which reports: (1) the amount and type of both the crosslinking and noncrosslinking monomers, (2) the elongation of those compositions, and (3) the dosage required to cure them.

TABLE I

EFFECT OF CONCENTRATION OF THE NONCROSSLINKING MONOMER ON ULTIMATE ELONGATION OF A RADIATION CURED NBR ELASTOMER

| Cross-linking Monomer | Parts Per 100 Parts of NBR | Extender Monomer | Parts Per 100 Parts of NBR | Dose Mrad | Percent Elongation at Break |
|---|---|---|---|---|---|
| TMPT | 8 | None | | 10 | 200 |
| | 8 | GMA | 2 | 10 | 275 |
| | 8 | GMA | 4 | 10 | 440 |
| | 8 | GMA | 6 | 10 | 290 |
| TMPT | 12 | None | | 8 | 125 |
| | 12 | GMA | 4 | 8 | 175 |
| | 12 | GMA | 6 | 8 | 220 |
| | 12 | GMA | 8 | 8 | 190 |
| TMPT | 16 | None | | 5 | 125 |
| | 16 | GMA | 4 | 5 | 135 |
| | 16 | GMA | 6 | 5 | 150 |
| | 16 | GMA | 8 | 5 | 165 |
| | 16 | GMA | 10 | 5 | 135 |

In addition, using the methods described in Example 1, a series of compositions containing various noncrosslinking monomer candidates were prepared and evaluated and compared to a standard which contained no noncrosslinking monomer. The control composition contained 100 parts of Hycar 1032, which is a commercially available NBR rubber containing 34% by weight of acrylonitrile, 40 parts of carbon black and 8 parts of TMPT. The various compositions were irradiated at a dosage of 10 megarads. The results of the evaluation of these compositions are listed in Table II.

TABLE II

THE EFFECT OF VARIOUS NONCROSSLINKING MONOMER CANDIDATES ON THE ELONGATION OF A RADIATION CURED NBR RUBBER INITIALLY CONTAINING 8 PARTS BY WEIGHT OF TMPT PER 100 PARTS BY WEIGHT OF NBR

| | Noncrosslinking Monomer Candidate | Concentration In Parts By Weight Per 100 Parts Of NBR* | Percent Elongation |
|---|---|---|---|
| A. | None | — | 300 |
| B. | 2-Methoxy ethyl methacrylate | 4.1 | 400 |
| C. | 2-Methoxy ethyl acrylate | 3.7 | 350 |
| D. | 2-hydroxy propyl methacrylate | 4.1 | 500 |
| E. | 2-Hydroxy propyl acrylate | 3.7 | 450 |
| F. | 2-Ethoxy ethyl acrylate | 4.1 | 425 |
| G. | 2-Ethyl hexoxy ethyl acrylate | 6.4 | 470 |

*The concentrations were selected to provide an ethylenic unsaturation concentration equal to that provided by 4 parts of GMA.

While my invention has been described in terms of certain specific embodiments, it will be appreciated that other forms thereof could readily be adapted by one skilled in the art. Therefore, the scope of my invention is not to be limited to the specific embodiments disclosed.

What is claimed is:

1. An acrylonitrile-butadiene elastomeric composition having improved elongation properties comprising the high energy electron beam radiation-induced reaction product of, by weight:
    a. 100 parts of an acrylonitrile-butadiene random compolymer consisting of from 30 to 45% acrylonitrile,
    b. from 15 to 80 parts of carbon black,
    c. from 4 to 16 parts of trimethylolpropanetrimethacrylate, and
    d. a polymerizable noncrosslinking monomer selected from the group consisting of

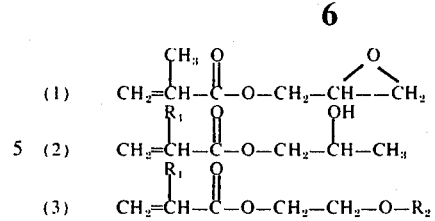

wherein $R_1$ may be —H or —$CH_3$, and $R_2$ may be —H or an alkyl group having up to 10 carbon atoms wherein the mole ratio of noncrosslinking monomer to trimethylolpropanetrimethacrylate is within the range of 1.0 to 1.4, and wherein said trimethylolpropanetrimethacrylate, said noncrosslinking monomer and said carbon black are initially uniformly dispersed throughout said copolymer.

2. An acrylonitrile-butadiene elastomeric composition having improved elongation properties comprising the high energy electron beam radiation-induced reaction product of, by weight:
    a. 100 parts of an acrylonitrile-butadiene random copolymer having from 31% to 39% acrylonitrile,
    b. from 20 to 60 parts carbon black,
    c. from 6 to 12 parts trimethylolpropanetrimethacrylate, and
    d. from 1.15 to 1.25 moles of glycidyl methacrylate per each mole of trimethylolpropanetrimethacrylate, wherein said trimethylolpropanetrimethacrylate, said glycidyl methacrylate and said carbon black are initially uniformly dispersed throughout said copolymer.

3. An acrylonitrile-butadiene elastomeric composition having improved elongation properties comprising the high energy electron beam radiation-induced reaction product of, by weight:
    a. 100 parts of an acrylonitrile-butadiene random copolymer having from 31 to 39% acrylonitrile,
    b. from 20 to 60 parts carbon black,
    c. from 6 to 12 parts trimethylolpropanetrimethacrylate, and
    d. from 1.15 to 1.25 moles of 2-hydroxypropylacrylate per each mole of trimethylolpropanetrimethacrylate, wherein said trimethylolpropanetrimethacrylate, said 2-hydroxypropylacrylate and said carbon black are initially uniformly dispersed throughout said copolymer.

* * * * *